United States Patent
Barna et al.

(10) Patent No.: US 7,286,180 B2
(45) Date of Patent: *Oct. 23, 2007

(54) CMOS IMAGE SENSOR WITH A LOW-POWER ARCHITECTURE

(75) Inventors: Sandor L. Barna, Pasadena, CA (US); Giuseppe Rossi, Pasadena, CA (US); Kwang-Bo Cho, Los Angeles, CA (US); Roger Panicacci, San Clemente, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/418,268

(22) Filed: May 5, 2006

(65) Prior Publication Data

US 2006/0197857 A1    Sep. 7, 2006

Related U.S. Application Data

(63) Continuation of application No. 09/683,679, filed on Feb. 1, 2002, now Pat. No. 7,068,319.

(51) Int. Cl.
*H03M 1/12* (2006.01)
*H04N 5/225* (2006.01)
*H04N 5/335* (2006.01)
*H04N 5/235* (2006.01)
*H01L 27/00* (2006.01)

(52) U.S. Cl. .................. 348/372; 348/302; 348/229.1; 250/208.1; 341/155

(58) Field of Classification Search ................ 348/302, 348/372, 294, 211.4, 222.1, 229.1, 230.1, 348/273, 280, 281, 300, 313, 312, 316, 319; 250/208.1; 341/144, 155

See application file for complete search history.

(56) References Cited

U.S. PATENT DOCUMENTS

| 5,471,515 | A | 11/1995 | Fossum et al. |
|---|---|---|---|
| 5,504,909 | A | 4/1996 | Webster et al. |
| 5,886,659 | A | 3/1999 | Pain et al. |
| 5,886,691 | A | 3/1999 | Furuya et al. |
| 5,929,800 | A | 7/1999 | Zhou et al. |
| 6,018,364 | A | 1/2000 | Mangelsdorf |
| 6,124,819 | A | 9/2000 | Zhou et al. |

(Continued)

OTHER PUBLICATIONS

Cha et al.; "Digitally-Controlled Automatic Gain Control Circuits for CMOS CCD Electronic Cameras"; 6th International Conference on VLSI Design and CAD, Oct. 26-27, 1999; pp. 342-345.

(Continued)

*Primary Examiner*—John M. Villecco
(74) *Attorney, Agent, or Firm*—Dickstein Shapiro LLP

(57) ABSTRACT

A system of reducing power consumption in and active pixels sensor. The sensor is broken into different blocks, and each of the blocks is individually optimized. The optimization may include minimizing the parasitic capacitance on the readout bus, turning off biases when not in use, and operating in a way that minimizes static power consumption of different elements such as A/D converters.

9 Claims, 10 Drawing Sheets

U.S. PATENT DOCUMENTS

| | | | |
|---|---|---|---|
| 6,137,432 A | 10/2000 | Xiao | |
| 6,229,134 B1 | 5/2001 | Ang et al. | |
| 6,233,012 B1 | 5/2001 | Guerrieri et al. | |
| 6,366,320 B1 | 4/2002 | Nair et al. | |
| 6,429,413 B1 | 8/2002 | Kawahara et al. | |
| 6,441,357 B2 | 8/2002 | Ang et al. | |
| 6,606,122 B1 | 8/2003 | Shaw et al. | |
| 6,646,583 B1 | 11/2003 | Fossum et al. | |
| RE38,499 E * | 4/2004 | Merrill et al. | 348/301 |
| 6,734,905 B2 | 5/2004 | Fossum et al. | |
| 6,753,801 B2 | 6/2004 | Rossi | |
| 6,847,399 B1 | 1/2005 | Ang | |
| 6,982,758 B2 * | 1/2006 | Rossi | 348/300 |
| 7,005,628 B2 | 2/2006 | Rossi | |
| 2002/0054233 A1 | 5/2002 | Juen | |
| 2002/0139921 A1 | 10/2002 | Huang et al. | |
| 2002/0166948 A1 | 11/2002 | Rossi | |
| 2004/0207739 A1 | 10/2004 | Rossi | |
| 2004/0233324 A1 | 11/2004 | Galambos et al. | |
| 2005/0280737 A1 | 12/2005 | Takayanagi | |
| 2006/0250513 A1 * | 11/2006 | Yamamoto et al. | 348/294 |

OTHER PUBLICATIONS

Tanner et al., "An 8-bit Low-Power ADC Array for CMOS Image Sensors"; 1998 IEEE International Conference on Electronics, Circuits, and Systems; Sep. 7-10, 1998; vol. 1, pp. 147-150.

Pain et al., "A Low-Power Digital Camera-on-a-Chip Implemented in CMOS Active Pixel Approach"; 12th International Conference on VLSI Design; Jan. 7-10, 1999; pp. 26-31.

McIllrath, Lisa G., "A Low Power, Low Noise, Ultra-Wide Dynamic Range CMOS Imager with Pixel-Parallel A/D Conversion"; 2000 Symposium on VLSI Circuits Digest of Technical Papers; pp. 24-27.

* cited by examiner

CMOS IMAGE SENSOR WITH A LOW-POWER ARCHITECTURE

This application is a continuation of application Ser. No. 09/683,679, filed on Feb. 1, 2002, now U.S. Pat. No. 7,068,319, which is hereby incorporated by reference in its entirety.

BACKGROUND OF INVENTION

Overall power consumption may be extremely important in camera systems and other type systems which use image sensors. Reduction of power consumption can prolong battery life, and can correspondingly allow smaller devices with smaller batteries or fewer batteries. However, there is often a direct trade-off between the amount of power that is consumed, and the quality of the image or images obtained by the sensor.

SUMMARY OF INVENTION

The present application teaches an image sensor architecture with reduced power. According to an aspect, different areas of the image sensor are optimized separately, to save power.

BRIEF DESCRIPTION OF DRAWINGS

These and other aspects will now be described in detail with reference to the accompanying drawings, wherein.

DETAILED DESCRIPTION

Figure 1:
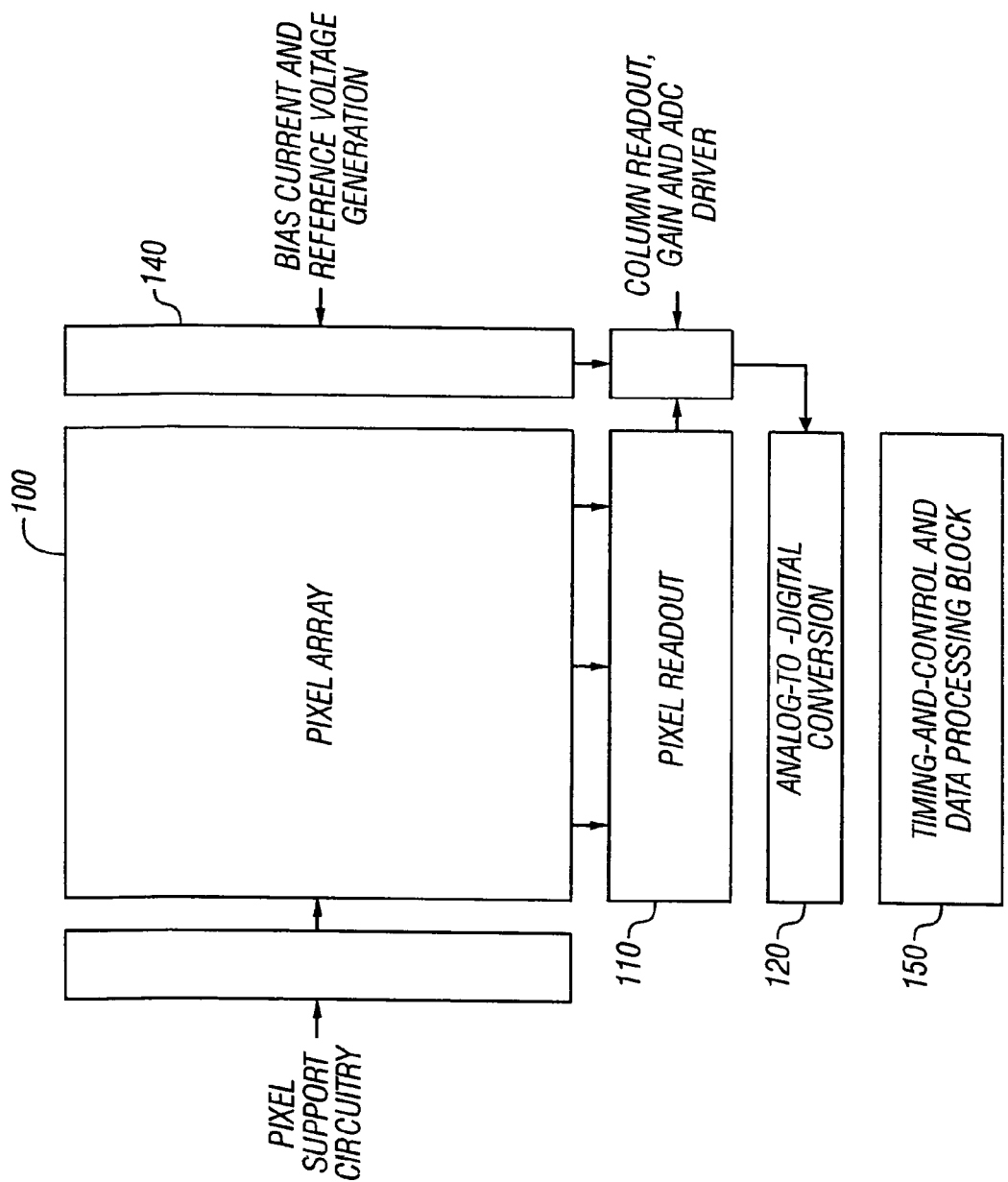
FIG. 1 shows a basic block diagram of an active pixel sensor.

FIG. 1 shows a basic block diagram of a CMOS image sensor. The CMOS image sensor is functionally a number of different blocks. According to the present system, different areas of this CMOS image sensor may be optimized separately in order to save power. Specifically, the column readout, gain and output drive, may be separately optimized.

Block 100 includes the pixel array and its support circuitry, which can include the pixel selection circuitry, and bias current and reference voltage generation elements.

Block 110 includes the pixel readout circuitry, which may include the column readout circuitry, the gain circuits, and the A/D converter driving circuits.

The A/D conversion itself is carried out by block 120 which can include an array of A/D converters of any type, and may be successive approximation A/D converters, or other kinds as described herein.

The bias current and reference voltage generation block 140 produces specific voltages for operation of the pixel array.

The control of the pixel array is effected by a timing and control data processing block 150.

The system according to the present invention describes analysis of each of these blocks, to determine if power consumption can be reduced.

It is noted that in a CMOS image sensor, the pixel array 100 may produce relatively little power. However, the pixel readout circuitry 110 may itself may consume larger amount of power that can be managed.

One aspect defines reading out the columns at high speed but low-power.

Another aspect may separate the readout amplifier of the pixel into three separate amplification elements to respectively read out columns, apply gain, and apply signal drive to the A/D converter. Each of these elements may be separately optimized for the minimum performance requirements of the stages.

A/D conversion by block 120 may be implemented using a pair of low-power, successive approximation, A/D converters. These may operate using overlapping timings. One of the A/D converters begins its conversion when the previous A/D converter is converting, e.g., halfway through its operation. In the embodiment, one of the A/D converters is applied only to data from the green pixels, and the other A/D converter receives data from the red and blue pixels. Therefore, any offset after calibration between the AID converters may be masked by the inherent signal differences between the different color pixels.

The bias current generation (block 140) generates bias currents through repeated current mirroring. In this system, bias current is minimized at all stages other than where it is actually used by the circuitry. Voltage reference power consumption is primarily carried out in the buffering amplifiers that are used to drive the generated voltage into the analog circuitry. These amplifiers are also optimized to use the minimum power for their required operating conditions. The amplifier driving the column clamp voltage is also turned off when it is not being used. This may allow turning on the column clamp voltage over only about 5 percent of the operation cycle.

The logic of timing and control/data processing is formed by digital logic gates. The power consumption of the logic is proportional to the total number of logic gates, multiplied by the frequency at which those gates are switched. The power consumption is optimized by minimizing the switching of the gates. A gate that performs a specific function is switched only when that specific function is needed. For example, this system may only switch the pixel readout timing block during pixel readout.

The master clock controlling this logic may run faster than, e.g., six times the data rate. This makes it possible to reduce clock speed of all the data processing logic down to ⅙ of the master clock rate. This may even further reduce the power.

Figure 2:
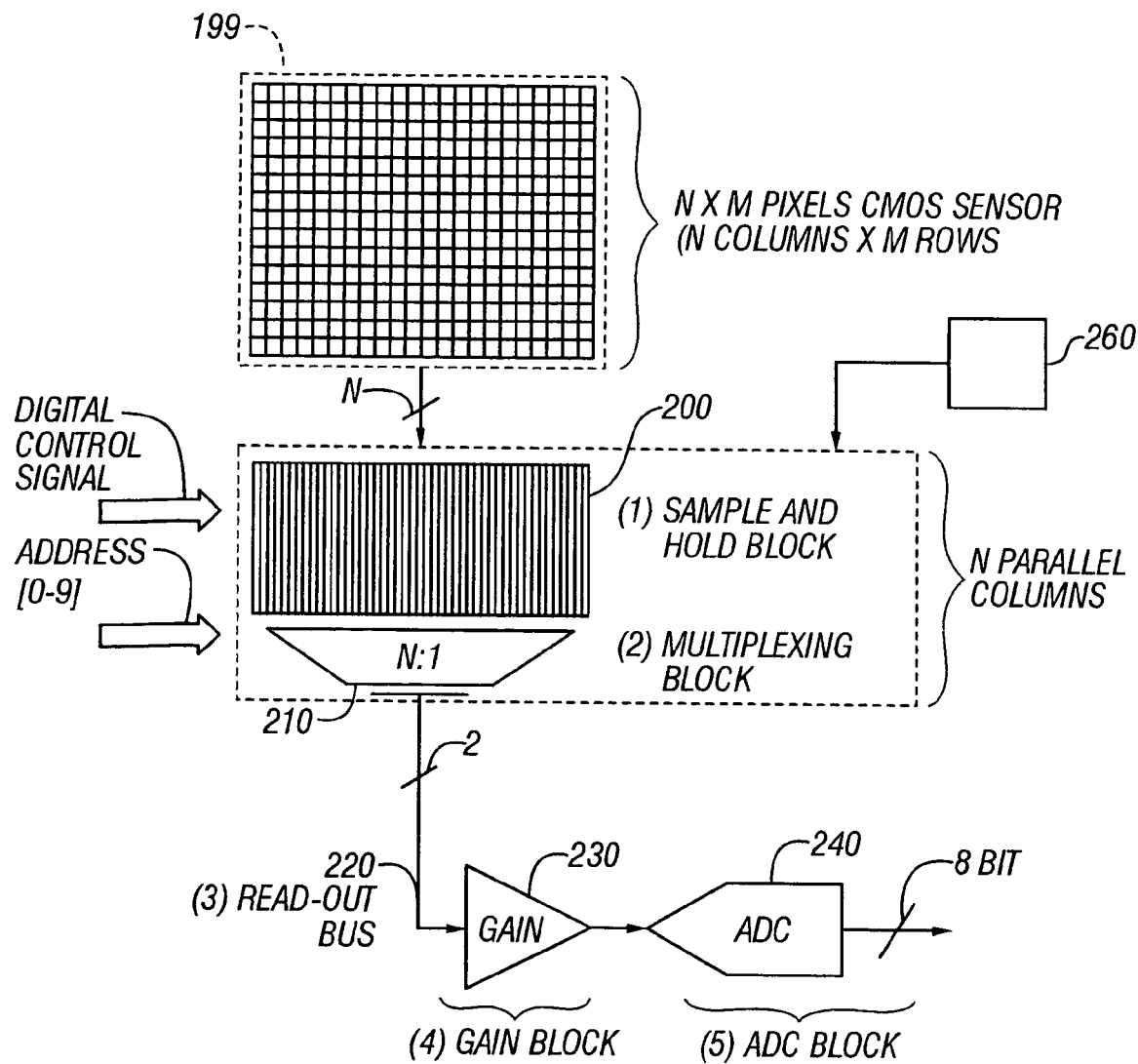
FIG. 2 shows a block diagram of the readout chain for an active pixel sensor.

The analog circuitry may be subdivided, and separately optimized, as shown in the block diagram of FIG. 2. The block show includes the basic building blocks of the analog circuitry. This includes the sample and hold block 200 which acquires and holds the signals from the photo sensor array 199. Multiplexing block 210 may reduce the number of signals, which is output to the readout bus 220. The gain block 230 may simplify these signals and apply them to A/D converter block 240. In addition, a bias current and voltage reference generation block 260 produces associated signals which are used as part of the conversion.

Figure 3:
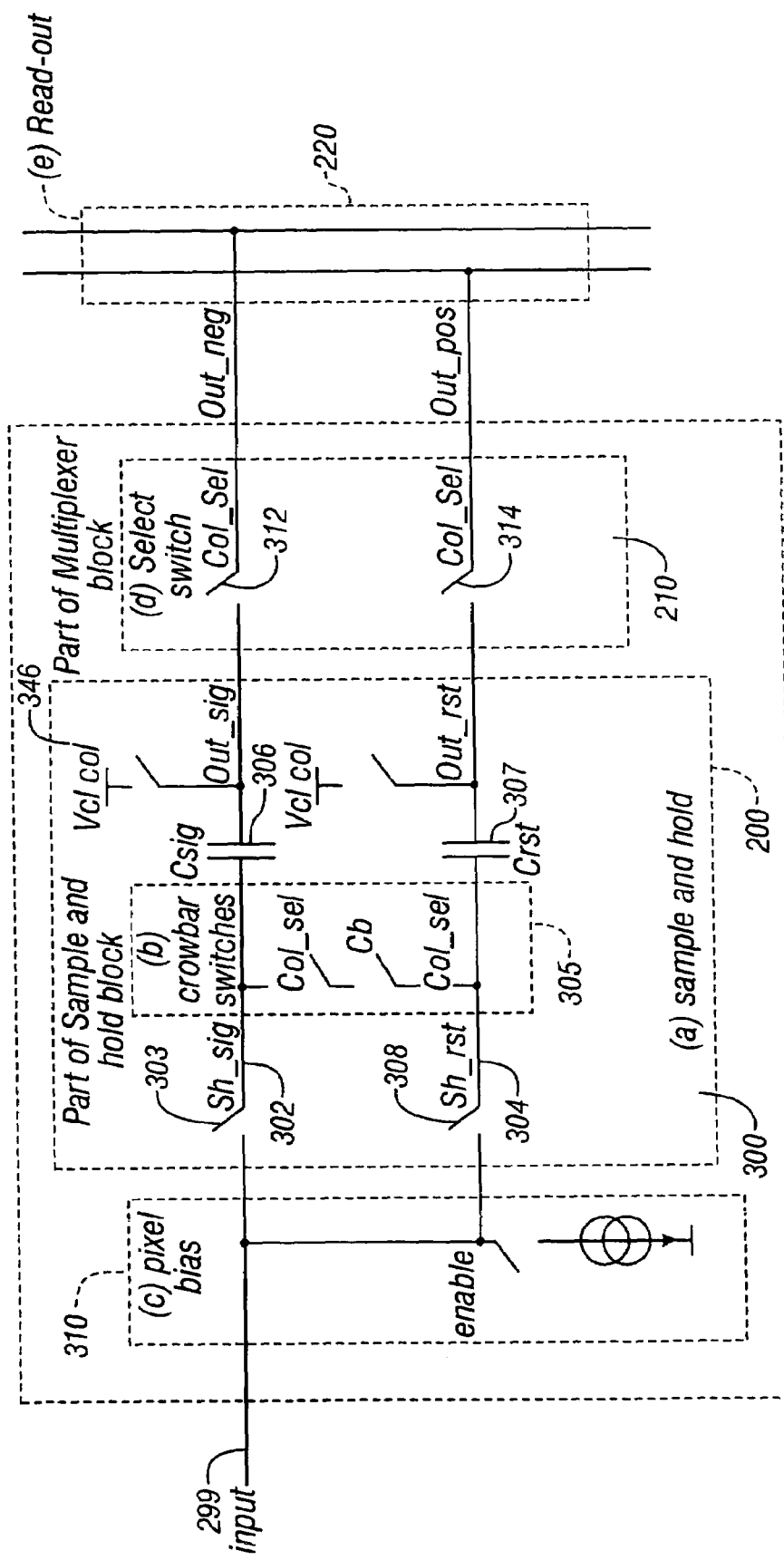
FIG. 3 shows a single column parallel element.

In operation, the active pixel sensor is formed from an array of photoreceptors 199. The array of photoreceptors has M rows and N columns of pixels, where in general M and N can be the same or different numbers. The readout chain typically uses a column parallel architecture. An element is shown in FIG. 3. N parallel columns of signal processing circuitry are located on the chip, with one set of elements associated with each of the rows of the sensor. The circuitry indicative of the parallel columns is grouped according to functionality. In a typical circuit, each of the column circuits includes a sample and hold block 200, followed by a multiplexer block 210. The sample and hold block 200 holds the signal, and may carry out various signal processing on the sample. The multiplexer block 210 serializes a full row of signals at a time onto the readout bus 220. Gain stage 230 amplifies the multiplexed output and analog to digital block 240 performs digital signal digitization of the amplified signal. Circuits are all set to their ideal operating conditions via biasing current and the voltage reference generation block 200.

The sensor may be continuously read out, row by row, using a rolling shutter.

During the readout of a specified row j, the signal and reset levels of the n pixels that belong to that row j are sampled by the sample and hold block 200 of the parallel column. Those pixels are then serialized by the multiplexer block 210 and sent to the gain 230 and A/D conversion block 240. The AID conversion block 240 digitizes the signals, and then a new row of pixels from the sensor is sampled into the sample and hold block, and the process repeats by serialization and digitization. The system hence converts a row at a time.

The sample and hold block 200 is in actuality formed of N parallel columns of processing circuitry. Each column of processing circuitry matches to a column of pixels of the sensor 199. FIG. 3 shows a single one of these columns of the sample and hold block as element 300. The sample and hold circuits include a set of crowbar switches 305 as well as an additional bias circuit 310 used for forming an active pixel bias.

In operation, each input such as 299 represents a line from a specific column of pixels in the array. The array is controlled so that each line receives one pixel at a time. During readout, all of the pixels that belong to the selected row are sampled by closing appropriate switches. The switch 308 may be first closed in order to sample the level of reset onto the reset holding capacitor 307. Analogously, switch 303 may be closed to sample the signal level onto the capacitor 306.

Those values are held on the capacitors 306, 307 for a specified time. During the time that the values are being held, specified switches 312, 314 in the multiplexer are closed to connect the pair of sampled signals (signal and reset) to the readout bus. Once the signals are connected to the readout bus, the crowbar switches 305 are closed. This has the effect of forming an average between signal and reset, and also changing the charge value to a voltage value. Hence, operating the crowbar averages the signals, thereby providing a voltage value indicative of reset minus signal.

The multiplexing block 210 may be a linear multiplexing circuit operating to multiplex the sampled voltage values into the readout bus. The circuit as shown in 210 is actually a set of parallel switches including switch 312 and switch 314. Each switch connects a parallel column to the common readout bus 220. Each select switch is closed at an appropriate time by a signal generated by a column decoder that is controlled by the digital block. At each clock cycle, one pair of selects is connected to the readout bus, thereby allowing a serial readout of the sampled row of pixels.

The multiplexer block sees parasitic capacitance to ground that is added from the readout bus. This parasitic capacitance may originate from the multiplexer switches 312, 314. A linear multiplexer for a CIF sized sensor may load the readout bus with parasitic capacitance to ground of a few picofarads. This capacitance may limit the performance of the gain block that is connected to the multiplexer block.

Figure 4:
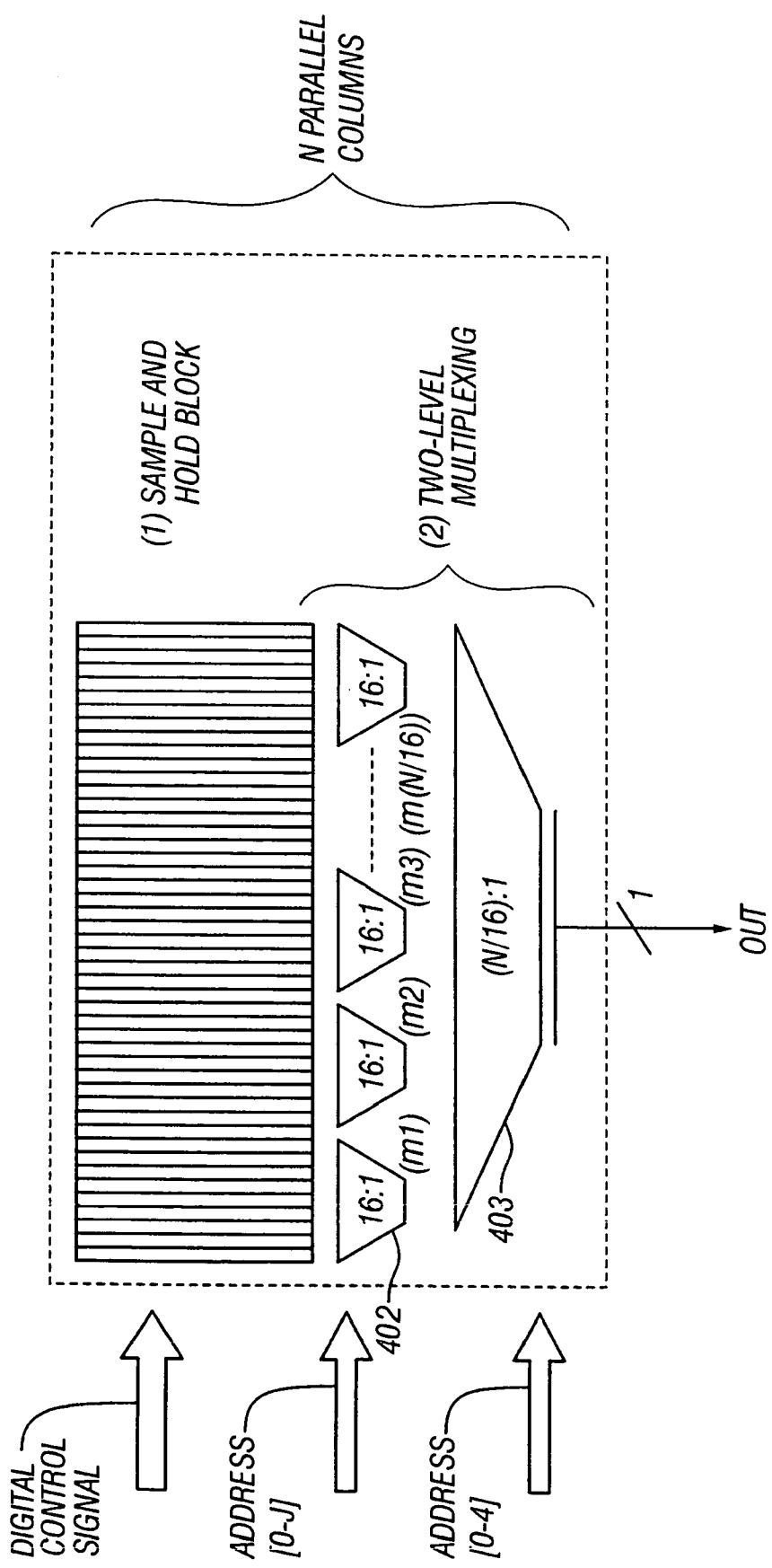
FIG. 4 shows an alternative block diagram of a two level multiplexing block.
Figure 5:
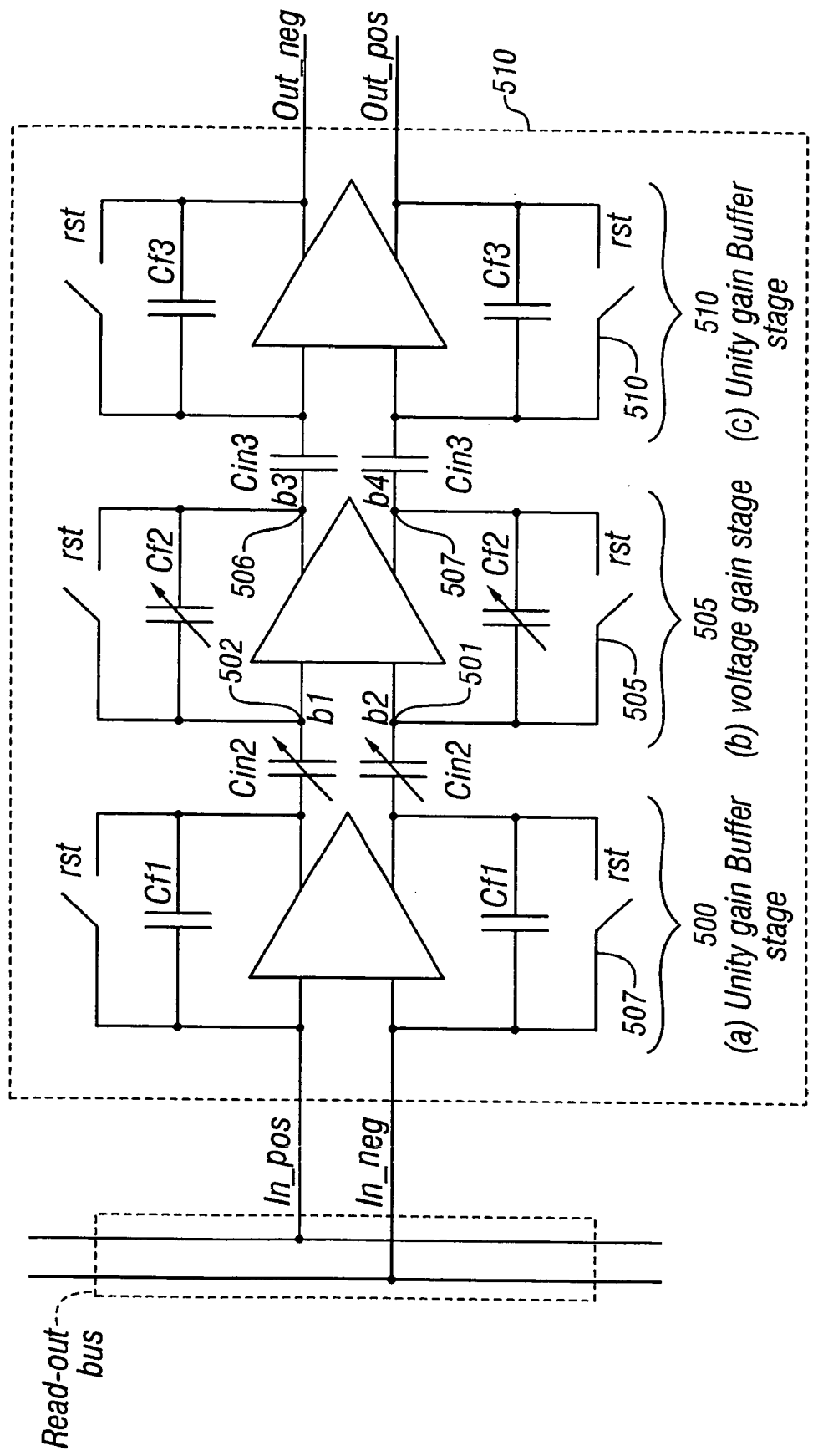
FIG. 5 shows a fully differential gain block with input and output isolation.

An alternative embodiment may be used to reduce the parasitic capacitance. This alternative embodiment, shown in FIG. 4, uses a nested architecture having multiple selection levels.

A first level, groups parallel columns together into groups of 16 elements. Each group of 16 elements is connected to a 16:1 multiplexer 402. Each of the 16-element multiplexers select one of the 16 inputs. This forms the first level of selection. There may be 24 of these 16 input multiplexer blocks receiving addresses, shown as 0-j.

The second level of selection is implemented by a multiplexer 403 with 24 inputs.

The multiplexer 403 selects one of the outputs among the 24 that belong to the first level.

The readout bus 220 connects the output of the multiplexer 210 to the input of the gain block 230 the performance of the gain block may be optimized if the parasitic capacitance to ground of the readout bus is carefully controlled.

The gain block 230 preferentially differentially amplifies the information from the pixels. The differential amplification may enable rejection of and immunity against noise sources that are coupled into the power supply and ground.

The variable gain may vary in the range from unity to a maximum value of around 8. Gain granularity may be, for example, 1/16 for a gain lower than 4, and 1/8 for gains between 4 and 8.

For purpose of power optimization, the gain block may be subdivided into multiple stages. An initial stage 500 is a unity gain buffer stage. A final stage 510 may also be a unity gain buffer stage. The middle stage 505 may be a voltage gain stage. These multiple stages may decouple the parasitic capacitive load of the readout bus, which is originated from the multiplexer switches, from the gain stage inputs 501, 502. Similarly, the third stage 510 may be coupled to voltage gain stage outputs 506, 507 from the variable capacitive load of the A/D converter. The actual gain stage 505 therefore becomes isolated from any uncontrolled capacitive load both at input and output. Its performance can therefore be carefully optimized.

Unbuffered, fully differential folded cascode amplifiers with common mode feedback may be used for the gain block. This specific amplifier technology may have advantageous power consumption and frequency stability. Each stage may include a reset element, 507, to reset the stage between operations.

Figure 6A:
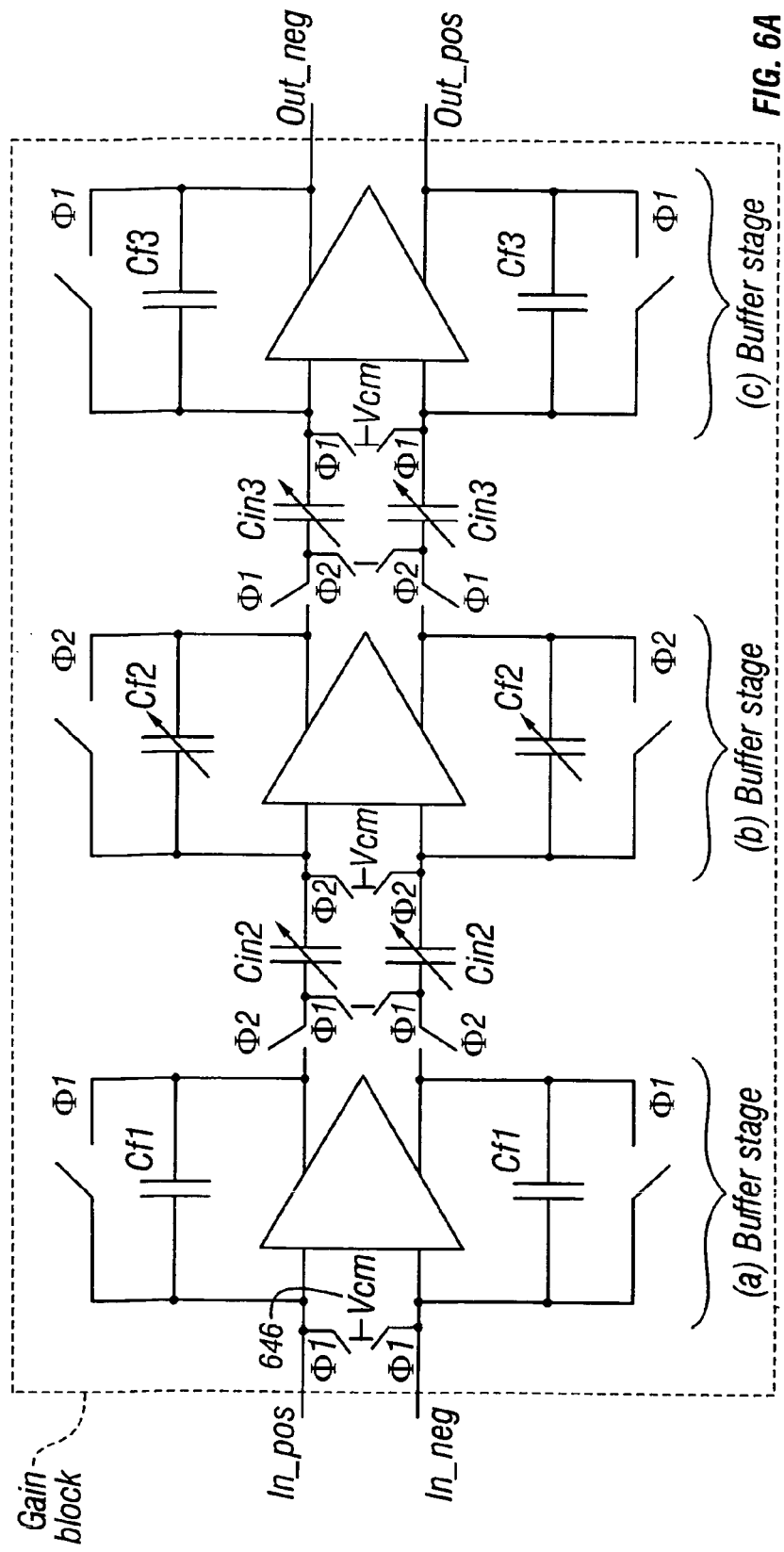
FIG. 6A shows an alternative gain block and FIG. 6B shows a clocking system for this gain block.
Figure 6B:
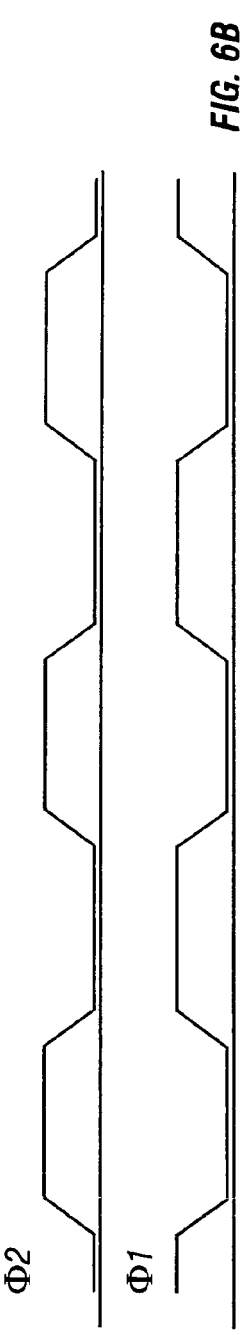

An alternative pipelined gain block is shown in FIG. 6a. The pipelining operation may relax the settling time requirements which may otherwise exist when a three stage gain block is used. In this embodiment, a two phase non overlapping clock may be used. The two phase clock is shown in FIG. 6b. Alternative phases are used for each stage of the gain block. At each of the clock cycles, a new column value is selected, and signal and reset values are sampled. It takes three clock cycles for the signal to reach the gain block output since intermediate sample and hold phases are present within each stage.

Figure 7:
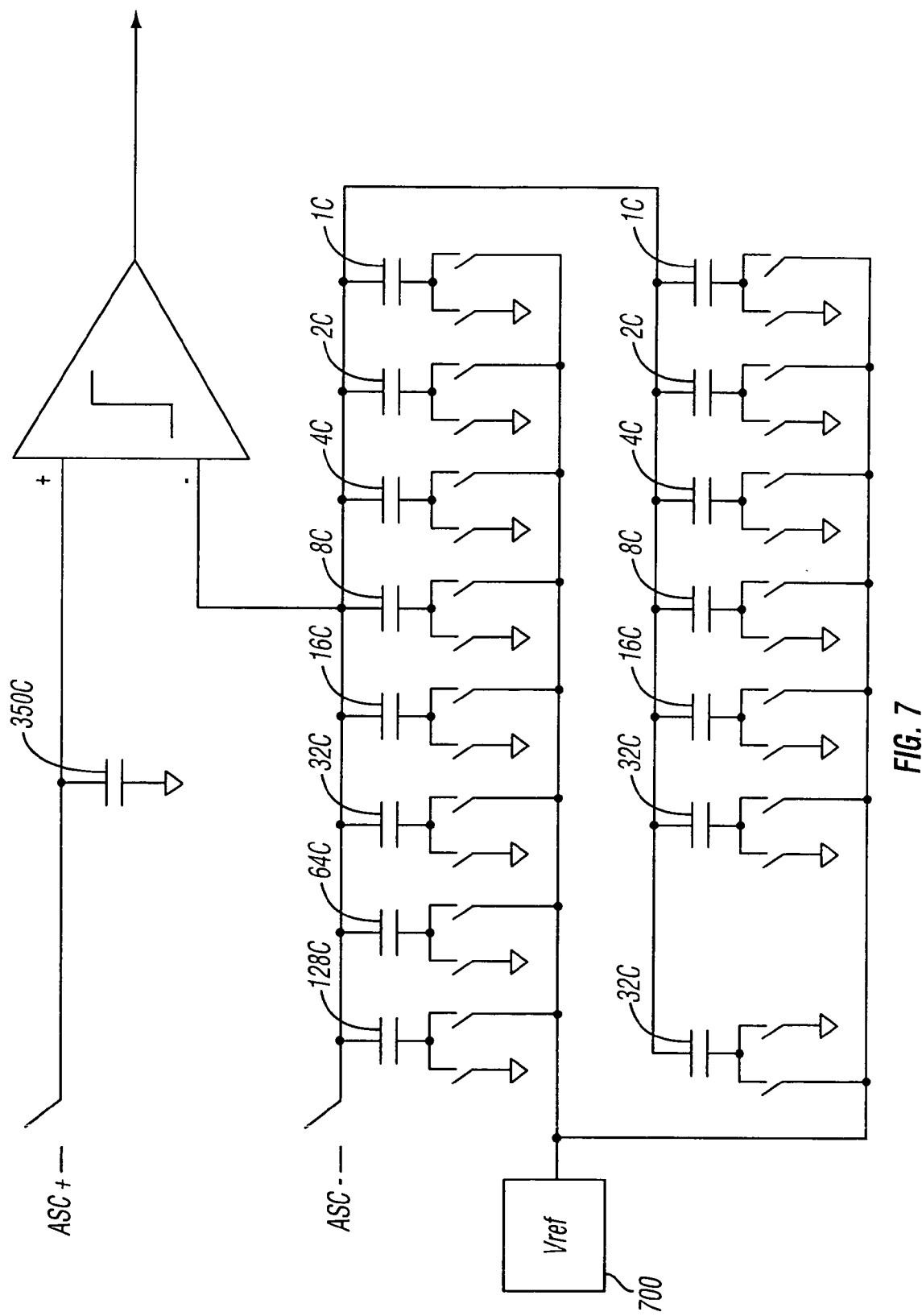
FIG. 7 shows a block diagram of a successive approximation AID converter with an adjustable voltage reference.

The A/D converter block 240 may be embodied by two successive approximation A/D converters as described above. FIG. 7 shows a specific A/D converter which may be used. An interlaced sampling scheme may effectively double the sampling rate of the A/D converter block as compared with the sampling rate of the single successive approximation A/D converter. This system may enable power saving it may reduce dissipation of static power.

A voltage reference generation element 700 on chip may generate the reference voltage for the A/D converter. This reference voltage may be fully adjustable, and may allow the A/D converter's conversion range to be adjusted based on the signal range. A variable A/D converter reference provides additional signal gain before digitization. Each A/D converter uses an offset compensation scheme that allows calibration and removal of systematic offset at the A/D converter inputs.

As an alternative system, other low-power A/D converters could be used in place of the successive approximation device. Other devices may have the advantage of further reduction of capacitance in the third stage of the readout circuit, thereby allowing the power of that stage to be even further reduced.

Figure 8:
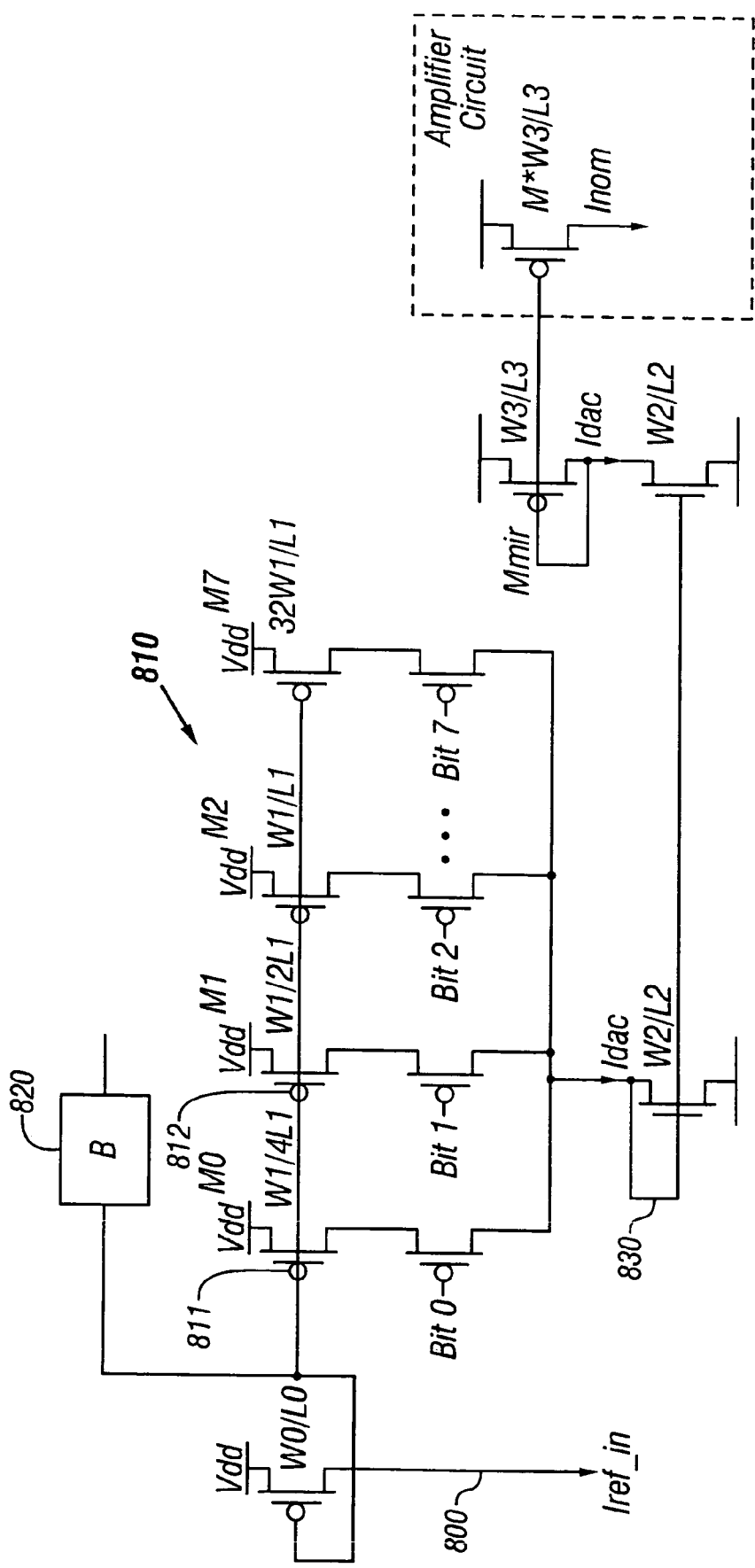
FIG. 8 shows a bias generation digital to analog converter.

FIG. 8 shows using current multiplication type digital to analog converter for the bias current and voltage reference generation block which produces bias currents for the amplifier. Digital to analog converter 810 mirrors a master current 800 into a current sources which are binary scaled according to bits 0 bit 7. A separate circuit 820 may mirror according to a different binary value.

Each of the mirrored currents M0 M7 is either selected or not selected according to the respective bit 0-7. For example, if bit 0 is active, the mirrored current M0 is passed, through transistor 811. Transistor 811 has a width to length ratio of 4. Analogously bit 1 controls transistor 812, which has a width to length ratio of 2. Other bits control different transistors with different characteristics are shown in FIG. 8. The selected currents are summed as current IDAC by summary transistor 830 and mirrored to the desired circuit.

Rather than generating the desired currents for each circuit in each current D/A converter, instead, the D/A converters are controlled to produce a 10 µA nominal current as their default setting. This current is mirrored into the amplifier according to a ratio. In this way, the bias voltages are generated with a very small total current, thus reducing the current generation power consumption.

Figure 9:
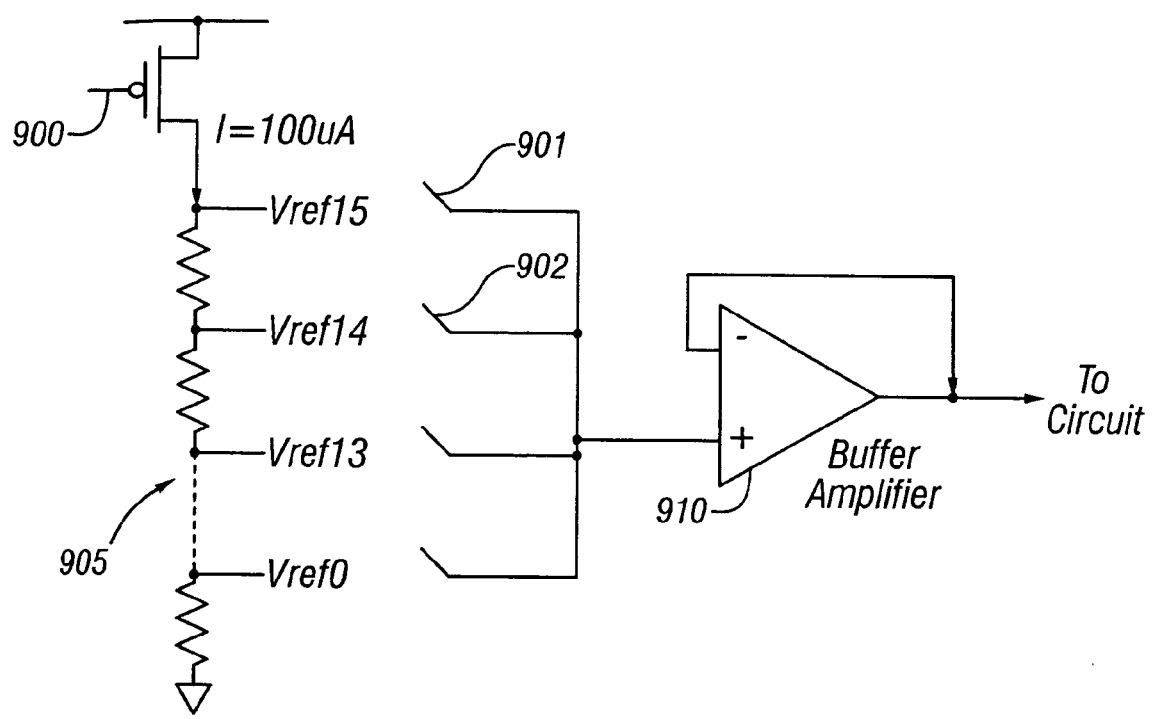
FIG. 9 shows a voltage reference generator.

A voltage reference generation is performed by passing a nominal reference current 900, e.g. 100 µA, through a resistor division chain 905, to ground. This produces a series of voltages vref 15, vref 14, vref 13 . . . at the connections between the resistors in the chain. These voltages can be selected by selecting the appropriate switch 901, 902. FIG. 9 shows how any of the voltages such as vref 15, can be selected by actuating one of the switches such as 901. The selected voltage from the closed switch is then passed to the appropriate circuit by buffer amplifier 910.

Typically, three voltages are required to operate an active pixel sensor. These include the AID converter reference voltage, the clamp voltage for pixel readout shown as Vcl_col 346 in FIG. 3, and the common mode feedback voltage shown as Vcm 646 in FIG. 6. Often the clamp voltage and the common mode voltage are the same voltage and share of common buffer amplifier. However, load requirements on these two voltages may be quite different. Therefore, a lower total power consumption may be obtained from using two separate amplifiers to produce the two different voltages.

For example, the column clamp voltage often needs to drive a very large load caused by the 1 pf per column, times nine columns of the total device. This is only needed during the pixel sampling time, however. In contrast, the common mode voltage drives a much smaller load, but may be needed during the entire readout cycle. Therefore, the amplifier driving the clamp voltage may be turned off when it is not needed.

Figure 10:
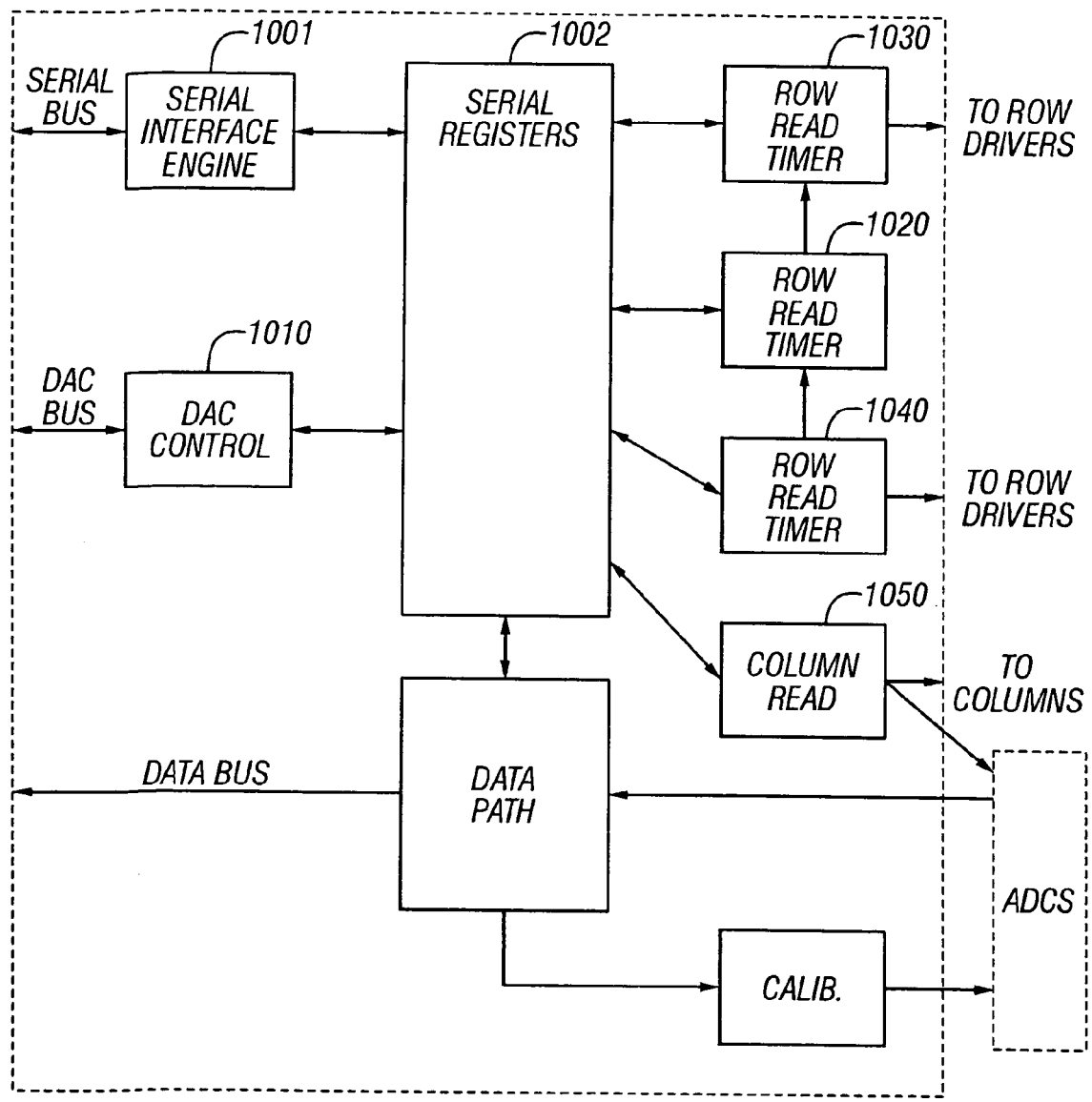
FIG. 10 shows a block diagram of the registers used for carrying out digital timing.

FIG. 10 shows a block diagram of the registers used for carrying out digital timing and control data processing logic. This device in a CMOS sensor may have a serial interface, D/A converter controller, integration timing calculator, pixel row read timing element, shutter reset timing, column readout control, data processing element, and calibration. Each of the different elements again may be separately optimized. For example, the serial interface is formed by a serial interface engine 1001 and an array of serial control registers 1002. The serial interface is only clocked when the sensor detects a command from the serial bus. In a global sense, this may be a relatively rare event. The command from the serial bus may occur on average less than once per frame, and hence the expected average duty cycle for this logic will be less than one percent.

D/A converter control may also be carried out by a D/A control block 1010. This element is only clocked at the beginning of each frame. In this way, the stored values within the D/A converters are clocked only at these times. At other times, no clocking is carried out. Once again, this may be a relatively rare event, and may occur less than the one percent duty cycle.

Integration timing calculation is carried out by the block 1020. This element may calculate roll addresses for readout and shutter reset. This block may only require clocking for a few clocked elements that the beginning of each row. Again, the duty cycle for this block may be less than one percent, thus further saving power.

The pixel row read timing may also be controlled by element 1030. The pixel row read takes several microseconds at the beginning of each row. This block will be clocked only during that time. This may provide a total duty cycle less than 6 percent. Similarly, shutter reset timing 1040 controls reset of the pixels in the shutter row. This also requires a few microseconds during each row, and enables a duty cycle of less than 5 percent.

Column readout control is controlled by element 1050. The column readout control generates the column addresses and triggers the A/D converters and readout amplifiers. This occupies the majority of the operational time. However, computations are only required at the pixel rate. The pixel rate is often several times slower the pixel rate, power consumption may be reduced by the ratio of the two clocks.

Similarly, data processing logic only requires clocking at the pixel clock rate, not the master clock rate. Again, the data processing element may reduce power consumption according to the ratio of the two clocks.

The signal path may typically be calibrated by performing simple calculations, e.g. averaging, on the data from the dark pixels surrounded the image collection area in the pixel array. The block of dark pixels may be clocked at the pixel clock rate. This only requires clocking during the readout of the dark rows. This can reduce the duty cycle to below 2 percent. Even further savings may occur if the pixels are clocked at the pixel rate instead of the master clock rate.

Although only a few embodiments have been described in detail above, other modifications are possible.

What is claimed as new and desired to be protected by Letters Patent of the United States is:

1. An image sensor, comprising:
an array of photosensitive pixels arranged into rows and columns;
means for reading out analog pixel values from the columns of the array;
a first analog-to-digital converter, the first analog-to-digital converter converting, at a first timing, analog pixel values from first colored pixels in the array; and
a second analog-to-digital converter, the second analog-to-digital converter converting, at a second timing offset from the first timing, analog pixel values from other colored pixels in the array,
wherein said second timing is about 50 percent of the way through a conversion cycle represented by said first timing, and the reading out means comprises timing and control logic having multiple outputs, each of which can be independently turned off when not in use.

2. The image sensor of claim 1, wherein said first color pixels are green pixels and the other colored pixels are red and blue pixels.

3. The image sensor of claim 1, wherein the analog-to-digital converters comprise successive approximation analog-to-digital converters.

4. An image sensor, comprising:
an array of photosensitive pixels arranged into rows and columns;
column readout circuitry connected to the columns, the circuitry producing a plurality of bias electrical values to be used during acquisition of image signals from the columns and turning off said bias electrical signals at times during the acquisition when the biases are not needed;
a gain stage, coupled to receive an output of said column readout circuitry, and to increase a signal level of said readout circuitry output; and
an output driving stage, which drives an output signal,
wherein each of said column readout circuitry, said gain stage, and said output driving stage include at least one element which optimizes a power consumption of the stage independent of other stages, and
wherein the bias signals include a clamped signal.

5. The image sensor of claim 4, wherein the column readout circuitry mirrors a single bias value multiple times to produce the plurality of bias electrical values, and turns off the mirroring to stop producing the plurality of bias electrical values.

6. The image sensor of claim 4, wherein said column readout circuitry includes an element that minimizes a stray capacitance.

7. The image sensor of claim 6, wherein said element that minimizes stray capacitance includes a multiplexer formed in multiple stages, each stage having fewer than all of the full number of signals.

8. The image sensor of claim 4, wherein said gain stage includes isolation stages which isolate an actual element carrying out the gain from input and output.

9. The image sensor of claim 4, wherein said gain stage includes an input unity gain buffer stage, an output unity gain buffer stage, and a gain stage coupled between said input unity gain buffers stage and said output unity gain buffer stage.

* * * * *

UNITED STATES PATENT AND TRADEMARK OFFICE
CERTIFICATE OF CORRECTION

PATENT NO. : 7,286,180 B2
APPLICATION NO. : 11/418268
DATED : October 23, 2007
INVENTOR(S) : Barna et al.

It is certified that error appears in the above-identified patent and that said Letters Patent is hereby corrected as shown below:

On the Title page, in item (75), in "Inventors", in column 1, line 2, delete "Giuseppe" and insert -- Guiseppe --, therefor.

On the Title page, in item (75), in "Inventors", in column 1, line 4, delete "San Clemente," and insert -- Los Angeles, --, therefor.

Signed and Sealed this

Twenty-fifth Day of December, 2007

JON W. DUDAS
*Director of the United States Patent and Trademark Office*